(12) United States Patent
Frohnhaus et al.

(10) Patent No.: US 6,189,399 B1
(45) Date of Patent: Feb. 20, 2001

(54) ADJUSTMENT DEVICE FOR MOTOR VEHICLE SEATS

(75) Inventors: Ernst-Reiner Frohnhaus; Burckhard Becker, both of Solingen; Michael Lingner, Düsseldorf, all of (DE)

(73) Assignee: C. Rob. Hammerstein GmbH & Co. KG, Solingen (DE)

( * ) Notice: Under 35 U.S.C. 154(b), the term of this patent shall be extended for 0 days.

(21) Appl. No.: 09/242,088

(22) Filed: Jan. 21, 1999

(30) Foreign Application Priority Data

Jan. 26, 1998 (DE) .......................................... 298 01 025 U

(51) Int. Cl.$^7$ .................................................... F16H 55/18
(52) U.S. Cl. .................. 74/440; 74/445; 74/458
(58) Field of Search .............................. 74/425, 437, 440, 74/445, 457, 458

(56) References Cited

U.S. PATENT DOCUMENTS 5,181,433 * 1/1993 Ueno et al. .............................. 74/409
5,934,144 * 8/1999 Marinkovic ............................. 74/440

\* cited by examiner

*Primary Examiner*—David Fenstermacher
(74) *Attorney, Agent, or Firm*—John Lezdey & Assoc

(57) ABSTRACT

The invention relates to an adjustment device for motor vehicle seats which contains a gearing part which meshes with a gearing member to limit backlash, the gearing part is formed by a main part consisting of a main gearing and a compensation part with an elastic member arrange between the parts. A swiveling axis connects the parts. The degree of backlash of the two parts is restricted to a circular movement based on the connection through the swiveling axis.

11 Claims, 1 Drawing Sheet

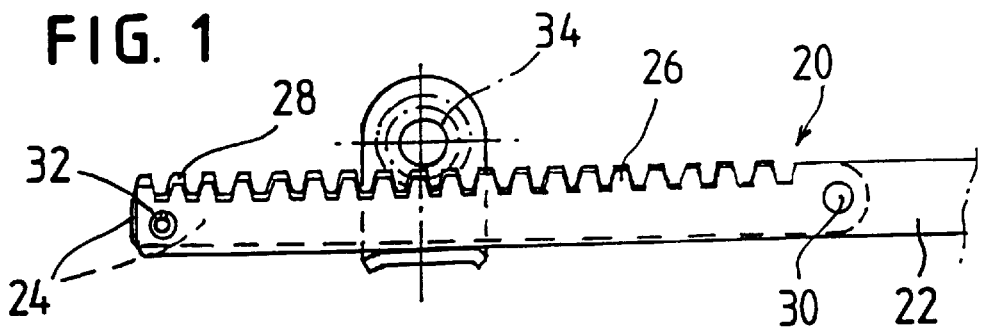
FIG. 1
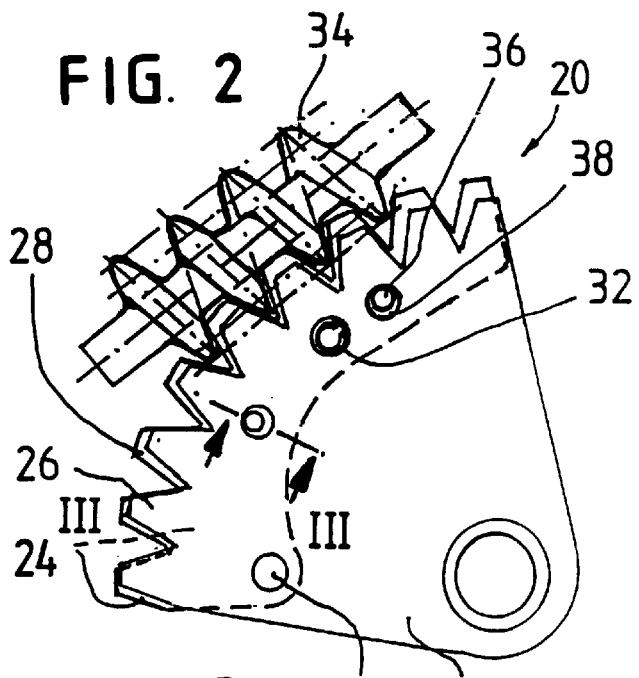
FIG. 2
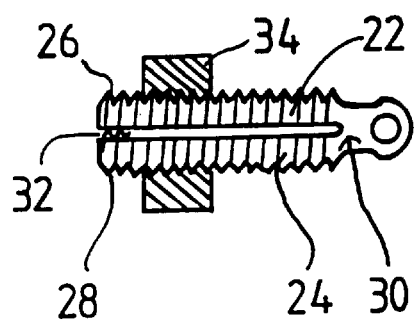
FIG. 6
FIG. 3
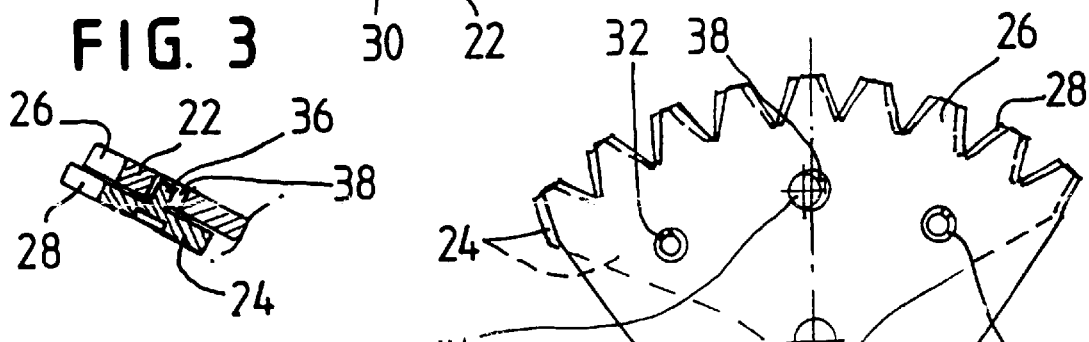
FIG. 4
FIG. 5
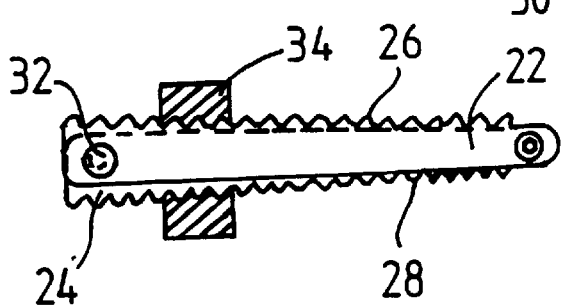
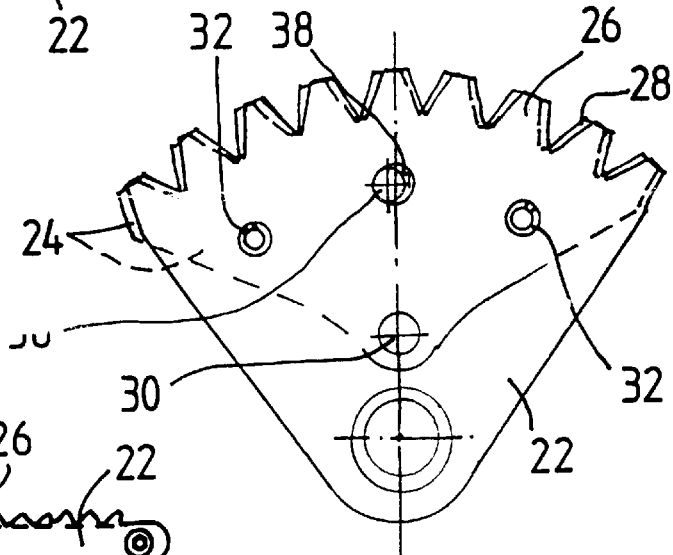

ADJUSTMENT DEVICE FOR MOTOR VEHICLE SEATS

FIELD OF THE INVENTION

The invention relates to an adjustment device for motor vehicle seats with a gearing part, which is in gear with an interlocked part of the driving mechanism or the descending force and which comprises a device for a compensation of the backlash between the gearing part and the part of the driving mechanism or the descending force.

BACKGROUND OF THE INVENTION

From the state of the art numerous devices and methods are known to develop and arrange gearing parts, which are in gear with each other in such a way that the tooth gear between them is essentially without backlash. Such adjustment devices, which are embodied in a manner free from backlash are advantageous for the relative movement between two parts of a motor vehicle seat, which are to be adjusted, because undesired backlash is practically excluded and noises caused thereof while driving, for example rattling, or mechanical movements, namely for example trembling of a part are mostly excluded. A zero backlash of the two parts of a motor vehicle seat, which are to be adjusted towards each other via an adjustment device is of a special importance, if the path is relatively long between the adjustment device and the place, where a force can act upon. This is the case for example with adjustment devices for the inclination adjustment of back rests. Here, the back rest is a fairly long lever, even a slight backlash in the joint of the adjustment device has an effect at the end of the back rest over the entire length of the lever.

The possibilities for compensating the backlash for adjustment devices of the kind mentioned here allow a compensation of the backlash over the entire adjustment path, which the two parts to be adjusted move along in a relative manner towards each other. The compensation of the backlash, however, has the disadvantage that the operational forces for the adjustment device also have to have an effect on the compensation for the backlash at the same time, namely moving the same at least partially or surmount it. The adjusting forces are therefore higher than with adjustment devices without a compensation of the backlash. Especially with manual adjustment devices a certain disadvantage is obvious, as higher operational forces are required.

SUMMARY OF THE INVENTION

This is where the invention starts. It is the task of the invention to further develop an adjustment device of the above mentioned kind with a compensation of the backlash in such a way that within the provided adjustment path, which the adjustment device offers, a compensation of the backlash is only provided in such a case, where it is really needed and the essentially easier adjustment practically without a compensation of the backlash is provided at that point where the two parts to be adjusted towards each other via the adjustment device are not in the position of use. Within the entire region of adjustment of the two parts to be adjusted against each other no complete compensation of the backlash is allocated to that kind of the part of the adjusting region, which is normally not permanently adjusted, but only run through when changing the position of the two parts against each other. The respective adjustment movement therefore occurs relatively easily. For the other part of the adjustment path, which usually corresponds to the chosen position of the two parts against each other by a user, a compensation of the backlash is provided, however.

The consequence thereof results in the fact that the backlash can be performed very easily and especially the induction of forces in the compensating part can be simplified. With a device for a compensation of the backlash a compensating part needs to perform some kind of relative movement, which is suitable to compensate an existing backlash. It has to be connected to the main part in such a mechanically safe way that forces may be induced via the same at the same time without the compensation of the backlash getting lost before a transfer of the forces is possible at all.

By the connection according to the invention of the main part and a compensation part via a swiveling axis (as a first connecting part) a first connection between main part and compensation part is developed, which is resistant to high pressure also with regard to the forces with a suitable dimensioning and which is defined in a mechanical manner. The degree of zero backlash of the two parts against each other is restricted to a circular movement based on the connection via the swiveling axis. The same is hereby limited to a small region of the arc of the circle by the piece of elastic means, which is arranged as a second connecting part between the main part and the compensation part.

In the vicinity of the piece of elastic means a larger relative movement of the teeth of the main part and the compensating part against each other is possible than in the vicinity of the swiveling axis. Near the swiveling axis however, practically no compensating movement of the two teeth against each other is possible. That way by a convenient arrangement of the swiveling axis and the piece of elastic means, the total adjustment region of the adjustment device can be divided in such a way that at least one adjustment region with a compensation of the backlash exists and at least one adjustment region with less compensation of the backlash. These different adjustment regions are used in such a way, that the region with a compensation of the backlash corresponds to the normal adjustment while the other region with less zero backlash, which is not complete, is essentially only run through with adjustment movements, it should not keep a stationary adjustment however.

Between the main part and the compensation part a swiveling axis, and only one alone, is provided, between the two at least one piece of elastic means is provided, may be even two, three or more pieces of elastic means, especially in the shape of dowel pins. In a preferred embodiment at least one thrust projects into the plane of the compensation part from the main part and the compensation part has a recess for receiving this thrust, which is preferably limited by arcs of a circle around the swiveling axis. That way, a mechanical allocation and a connection between the main part and the compensation part is achieved without any noticeable impairment of the swiveling path around the swiveling axis within the region preset by the piece of elastic means. The induction of the forces into the compensation part is thereby improved. In a preferred embodiment the recess is provided with a final part for the limitation of the swiveling movement into one direction and a further final part for the limitation of the swiveling movement in the other direction. Thereby the stress of the piece of elastic means beyond the range of elasticity is avoided. In a simple embodiment the recess is circular just like the thrust.

The teeth of the main gearing and the part of the compensation gearing are arranged towards each other in such a way that they essentially overlap each other. The overlap, however, is only more or less complete. As there are regions, where the overlap is nearly complete, this belongs to the adjustment region without a complete compensation of the backlash, and regions with a larger distance of the teeth amongst each other, this belongs to the adjustment region with a compensation of the backlash.

In a preferred embodiment the distance between the swiveling axis and the one piece of elastic means at least, which is preferably embodied as a dowel pin, is chosen as large as possible. Preferably the swiveling axis is arranged closer to the final part of the main gearing and also the part of the compensation gearing than at the other final region of these two gearings, especially the swiveling axis is in direct vicinity of the first-mentioned final region.

Further advantages and characteristics of the invention derive from the other claims as well as the following description of a non-restrictive embodiment of the invention, which is illustrated further with regard to the drawing. This drawing shows in:

BRIEF DESCRIPTION OF THE DRAWINGS

FIG. 1: A side view of an adjustment device with a gearing part, which is embodied in the shape of a steering rack, and a pinion, which here develops the part of the driving force and the part of the descending force, FIG. 2: a side view of an adjustment device, with which the gearing part is shaped in an arc-shaped manner and the part of the driving or descending force is embodied via an endless screw, FIG. 3: a sectional drawing along the intersection line III—III in FIG. 2, FIG. 4: an illustration similar to FIG. 2 of a gearing part, but this time in an other embodiment and arrangement of a compensation part, FIG. 5: a partially illustrated side view in the manner of a sectional drawing and an adjustment device with a gearing part embodied in the shape of a spindle of a nut, which forms the the part of the driving or descending force and FIG. 6: an illustration similar to FIG. 5, whereby this time the gearing part is formed however by two steering racks with gearings pointing in the opposite direction towards each other.

DESCRIPTION OF THE PREFERRED EMBODIMENTS

FIG. 1 illustrates an adjustment device with a gearing part 20 embodied in the shape of a steering rack (20). It is constituted of a main part 22 and a compensation part 24. The main part 22 has a main gearing 26, the compensation part 24 has a part of the compensation gearing 28, both gearings 26, 28 are of the same construction. The main part 22 and the compensation part 24 are connected in a hinge joint in the right part of FIG. 1 via a swiveling axis 30, which is embodied here in the shape of a rivet. It is arranged and positioned, that in its vicinity the teeth of the two gearings 26, 28 practically overlap, namely they are in an alignment.

In the left final region of the FIG. 1 the main part 22 and the compensation part 24 are connected with each other via a piece of elastic means 32 in the shape of a dowel pin. This effects an elastic connection between the two parts 22, 24 as well as a mechanical allocation, namely on one hand as a possibility of the transfer of major forces and on the other hand as a limitation of the possible pivoting angle around the swiveling axis 30. The dowel pin 32, which has been selected in FIG. 1 in a concrete manner, does not cover the entire 360 degrees, but leaves room for a ventilation slot between its loose regions. The positioning of the angles of this ventilation slot has a certain influence on the electricity, in the practical use attention does not have to be paid to the fact, however, that the orientation is always at the same angle, namely for example the ventilation slot towards the top.

Dowel pins 32 of a different kind may also be used, for example dowel pins, which are multiply wound. To make sure that the dowel pins 32 are secured within the bore holes, which have been provided for them in the two parts, the dowel pins are slightly deformed towards the outside, for example partially pushed aside towards the outside at their axial final regions, after they have been fitted. It is advantageous for this to embody the drill holes in the parts 22, 24 in such a way that they expand slightly towards the outside, namely away from the region of contact of the two parts 22, 24, to provide space for the respective extension of the dowel pin.

Near the dowel pin 32 the teeth of the two gearings 26, 28 do not overlap as strongly as in the right section.

A pinion 24 is provided as a part of the driving mechanism or as part of the descending force. In the actual illustrated embodiment it has a lower suspension. If this is provided, the compensation part 24 has to be developed in such a way, that it does not come into contact with the suspension within the permitted swiveling path. Expressed in a different manner, the suspension is only orientated at the narrow surface of the main part 22, which is opposite the main gearing 26. The suspension can also be embodied in the sense of a span, which encloses the gearing part 20 in a U-shape or O-shape manner.

In the practical use the gearing part 20 is connected in a hinge joint for example with a back rest, which is arranged at a seat carrier in a swiveling manner around a fixed swiveling axis. The pinion 34 itself is arranged at the seat carrier in a revolving manner. By turning the pinion the inclination of the back rest can be adjusted. That way the adjustment occurs with zero backlash, when the pinion 34 is turned anti-clockwise departing from the illustrated position, and therefore comes into gear with the gearing regions, which are positioned slightly further to the left. The compensation of the backlash is reduced however, the further right the gearing regions positioned are on the right of the pinion come into gear, the more the pinion is turned clockwise.

In the embodiment according to FIG. 1 the swiveling axis 30 and the dowel pin 32 only have a distance from each other, which practically corresponds to the total length of the compensation part 24.

The embodiment according to FIG. 2 illustrates a device for an angle inclination in contradiction to the linear adjustment device discussed so far. Furthermore than that the construction is similar to the embodiment according to FIG. 1, however. The main part 22 is essentially a sector with nine teeth of a main gearing 26, here. The compensation part 24 also has nine teeth. The swiveling axis 30 is provided at a final region, again only a piece of elastic means is provided in the shape of a dowel pin 32, the same is not provided, however, at the final part, namely near the ninth tooth (counted from the bottom), but near the sixth tooth. Due to that a slightly harder dowel pin 32 can be inserted then with the arrangement further outside, furthermore the compensation part 24 near the ninth tooth can be embodied in a relatively narrow manner.

Departing from the main part 22 two thrusts 36 project into the region of the compensation part 24. In the embodiment illustrated here in a concrete way they are arranged at both sides of the dowel pin 32. They project into recesses 38, which are embodied as circular holes, which are provided in the compensation part 24. A kinematic reverse is possible. The thrusts limit the possible swiveling path around the swiveling axis 30 via a stop motion device at the allocated recesses and thereby effect an additional mechanical connection of both parts 22, 24.

In FIG. 3 the arrangement of a thrust 36 and a recess 38 is illustrated in an intersectional drawing, again. It can be recognized that the thrust 36 projects from the flat material of the main part 22. That way an additional building component for the thrust 36 becomes superfluous. Other developments are possible.

The embodiment according to FIG. 4 essentially corresponds to the embodiment according to FIG. 2, but now the swiveling axis is essentially arranged on a folding symmetrical line, namely a line which runs through the center tooth (here the fifth tooth) and the swiveling axis 30. Two dowel pins 32 are provided, which are arranged in a folding symmetrical line as well and positioned near an outer tooth, here essentially the tooth before the last. Again, only an arrangement of a thrust 36 and a recess 38 is provided. They are arranged towards each other in the passive statte in such a way that the thrust 36 is adjacent to the left inner edge of the circular recess 38. That way the spring movement is only possible in one direction of rotation departing from the illustrated position.

In the embodiments according to the FIGS. 2 including 3 and 4 the part of the driving mechanism and the descending force 34 is an endless screw. In the last two embodiments to be discussed now the part of the driving mechanism and the descending force 34 a nut. In the embodiment according to FIG. 5 two steering racks are provided. One forms the main part 22, the other one the compensation part 24. In a concrete way both are of the same construction, but practically the main part will be extended to the right similar to the respective extension part of the main part 22 in FIG. 1. Main part 22 and compensation part 24 have a matching gearing, the teeth, however, point in the opposite direction. They are in gear with the already described nut. Main part and compensation part are connected in a swiveling manner with each other via a swiveling axis 30 at their right end. Their left final regions are penetrated by a dowel pin 32. The further the nut approaches this dowel pin 32, the larger is the travel of the spring system of the two gearings 26, 28 into the turn of the nut. The further the nut is turned towards the right, the smaller is the compensation of the backlash.

The embodiment according to FIG. 6 mostly corresponds to the embodiment according to FIG. 5, but now however, the arrangement of two steering racks is replaced by a slit threaded rod. Between the two sections, which are separated by the slit, an ondular washer is arranged as a piece of elastic means 32. It is positioned in the left final region. On the right the two sections blend into each other in one piece in such a way that the part of the swiveling axis, which is not embodied separately is positioned slightly on the right next to the end of the slit.

What is claimed is:

1. An adjustment device for motor vehicle seats with a gearing part, which is in mesh with a gearing member and wherein the gearing part is formed by a main part, which comprises a main gearing having teeth, and a compensation part having teeth said compensating part comprising a compensation gearing of essentially similar geometrical configuration as said main gearing, wherein said main part and said compensation part are connected via a swiveling axis and via at least a piece of elastic means so that said compensation part can be swiveled around the swiveling axis relative to said main part within a region of relative movement permitted by the piece of elastic means, said main gearing and said compensation gearing take up different spatial allocation toward each other, and wherein the swiveling axis is arranged closer to a final region of said main gearing and of said compensation gearing than to another other final region of the main gearing and the compensation gearing than to another final region of the main gearing and the compensation gearing.

2. The adjustment device according to claim 1 wherein said main gearing and said compensation gearing are arranged towards each other so that their teeth substantially overlap.

3. The adjustment device according to claim 1, wherein the region of said swiveling axis, is used for an adjustment of two parts of the motor vehicle seat relative to each other, and the position towards each other does not correspond to the normal position of use and that the other region of the main gearing and the compensation gearing which is positioned away from the swiveling axis is used for an adjustment of the two parts relative to each other in the region of a usual position of use.

4. The adjustment device according to claim 1 wherein at least one thrust projects from said main part towards the compensation part and the compensation part possesses a recess for receiving the thrust.

5. The adjustment device according to claim 4 wherein the recess is defined by arcs of circles around the swiveling axis.

6. The adjustment device according to claim 1, wherein the gearing member is a threaded nut, the main part comprises a steering rack having two main gearings pointing into opposite directions, the main part and the compensation part both exhibit two final regions and are connected with each other at one of their two final regions via the swiveling axis.

7. The adjustment device according to claim 1, wherein said gearing member comprises a threaded nut, and the main part and the compensation part comprise parts of a threaded rod which are in close connection with each other and which are separated from each other by an axial slit.

8. The adjustment device according to claim 1, wherein the gearing member is selected from the group consisting of a pinion, an endless screw, a steering rack or a sector gear.

9. The adjustment device according to claim 1, wherein the gearing part is connected with a first part of the adjustment device and the gearing member is connected with a second part of the adjustment device.

10. The adjustment device according to claim 1, wherein the main gearing and the compensation gearing are of the same construction.

11. The adjustment device according to claim 1, wherein said piece of elastic means is a dowel pin.

* * * * *